G. W. HAEL.

SCREW DRIVER.

No. 10,820. Reissued Mar. 22, 1887.

Witnesses
A. M. Gaskell,
R. H. Sanford.

Inventor
George W. Hael.
Per A. C. Paul,
Atty.

N. PETERS, Photo-Lithographer, Washington, D. C.

UNITED STATES PATENT OFFICE.

GEORGE W. HAEL, OF MINNEAPOLIS, MINNESOTA.

SCREW-DRIVER.

SPECIFICATION forming part of Reissued Letters Patent No. 10,820, dated March 22, 1887.

Original No. 303,003, dated August 5, 1884. Application for reissue filed August 2, 1886. Serial No. 209,810.

*To all whom it may concern:*

Be it known that I, GEORGE W. HAEL, a citizen of the United States, residing at Minneapolis, in the county of Hennepin and State of Minnesota, have invented certain new and useful Improvements in Screw-Drivers, of which the following is a specification.

This invention relates to improvements in that class of screw-drivers in which clamping devices are used for holding the screw; and the objects I have in view are to provide means by which the screw may be firmly clamped and held against the face or end of the shank so that it may be set into the wood without first starting it by boring or driving; also, to provide a clamp that will be automatically released and will spring away from the screw before the screw-head reaches the wood, thus permitting the operator to countersink the head or set it into the wood without stopping to release the clamp by hand.

The invention consists, generally, in a spring-clamp secured upon the bit-shank and adapted to be adjusted over the screw-head to hold it firmly to the bit, and adapted to be released at pleasure by hand or to be automatically released when it encounters the wood or other material into which the screw is being inserted.

Figure 1:
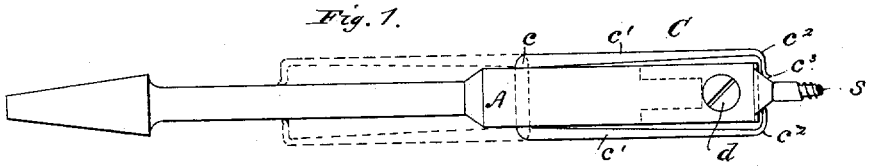
Figure 2:
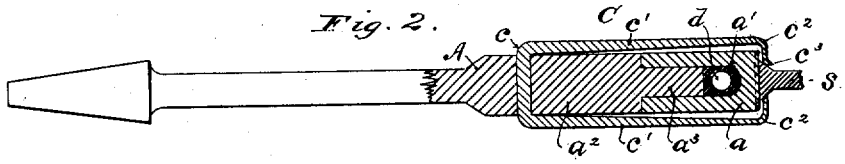
Figure 3:
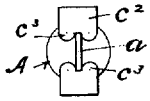
Figure 4:
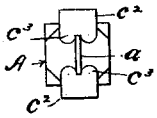

In the accompanying drawings, forming part of this specification, Figure 1 represents a bit provided with the clamping device. Fig. 2 is a longitudinal section of Fig. 1. Figs. 3 and 4 show end views of a round and square form of bit-shank with the clamp.

A is a bit-shank, which may be either round or angular, and used either with a handle or in a brace. In Fig. 3 is shown the round form of shank with a flat end or face, and Fig. 4 shows the square form with the corners at the end beveled. Any shape desired may be given the head of the shank; but it is preferable to have it flat for the head of the screw to bear against. In the head of the bit-shank is provided a central slot extending longitudinally therein for the reception of a thin plate of steel, $a$, to form the edge or bit proper. This plate should have a central slot, as $a'$, extending from its inner end about half its length, and it may then be secured within the shank by means of a screw, $d$, or a rivet through the shank. When the bit becomes dull and requires sharpening, or if it projects too far or not far enough, the screw may be loosened and the plate adjusted or removed for sharpening. The plate $a$ should be somewhat thicker than is desirable for the bit edge, and its end should be slightly beveled, so that it will be free from contact with the face of the shank-head. This will render the edge less liable to be broken off when in use than if it was firmly held by the extreme end of the shank, and it is preferable to have the bit edge project beyond the head of the shank only far enough to insure a firm turning hold in the screw-head slit without extending to the bottom of the slit, thus allowing the screw-head to rest on the end or face of the shank.

C is a spring-clamp that is pivoted upon the bit-shank, and is adapted to swing over its end. It is formed of suitable spring metal, and is preferably composed of a round middle portion, $c$, which forms the pivot upon which it swings, two arms, $c'$ $c'$, substantially at right angles to the part $c$, and clamping ends $c^2$ $c^2$ substantially at right angles to the arms $c'$ $c'$. The clamping ends, in order that they may hold screws of smaller sizes, should almost meet, and should be arranged to come very near to the bit edge when the clamp is swung over the end of the shank. They may be notched centrally, and their corners rounded and under edges beveled, and all made smooth, so as to permit them to be easily pressed over a screw-head and give a firm clamping hold.

The clamp is preferably so formed that when it encounters the surface of the wood it will be thrown off from the screw, and will spring away from the end of the shank. For this purpose a lip, $c^3$, is turned upon one or both of the clamping ends $c^2$, on the side in the direction of which the driver revolves in entering a screw.

In Figs. 1 and 2 is illustrated a mode of securing a clamping device such as described, which has been constructed before being inserted in the bit-shank. The slot in the shank, heretofore mentioned, is extended back to the point at which the part $c$ is to be placed, and there terminates in a rounded end. The part $c$ is then inserted, and held in place by a plate, $a^2$, inserted in the slot in the rear of the plate $a$, and may have a tongue, $a^3$, fitting into the slot $a'$, and extending to the screw $d$; or a screw or rivet may be passed through the bit-shank and plate $a^2$, to keep the plate in place, and thus secure the part $c$ of the spring in its place. Another mode of inserting and securing the clamping device is by making a hole through the bit-shank a proper distance from the end, and inserting in it a piece of round spring-wire, which can be afterward flattened and suitably formed into the spring-clamp described. In such construction the slot in the shank should not extend as far back as shown in the drawings, and only the plate $a$ need be used in the slot. In any mode of securing the clamping device to the bit the arms $c'$ must be permitted free rotary movement on the axis $c$, in order that they can be turned back out of the way when not in use. By making the bit-shank thinner at the point reached by the clamps when turned back, they can be made to clamp around the shank.

In operating the tool the slit of a screw-head is adjusted to the bit, and the operator presses the clamping ends $c^2$ $c^2$ over the beveled side of the head. The clamp is thereby slightly distended, and the flat face or side of the screw-head is drawn against the flat end of the shank. The screw is thereby firmly clamped to the shank. The flat face of the shank keeps the screw from tipping in any direction. While thus held the screw can be entered into the wood without being first started by boring or driving. As the screw-head nears the wood, the clamp may be disengaged from it by the pressure of the thumb or finger of the operator on the edge of the arm $c'$, and the clamp may be turned to any desired angle. The necessity for thus manipulating the clamp to get it out of the way can be avoided by having the clamp constructed so that it will be automatically released as it encounters the wood. This is especially desirable in using the bit in a brace where it is often necessary to use both hands in holding and turning the brace.

It is preferable to have the clamps arranged over the edges of the bit and turning upon an axis substantially parallel with its edge, rather than at an angle to it, in order that the screw-head may be held centrally to the bit and not slide on the bit.

I am aware that prior to my invention spring-clamping devices for holding screws have been used in connection with screw-drivers, and that means were provided for causing the clamps to seize or be released from the screw at the pleasure of the operator, and means also for withdrawing the clamp out of the way when the screw was nearly entered. I therefore do not claim such a combination, broadly; but What I do claim as my invention, and desire to secure by Letters Patent, is—

1. The combination, with a screw-driver bit, of a swinging spring-clamp pivotally supported upon the bit-shank and arranged to swing over the edge of the bit, substantially as and for the purpose set forth.

2. The combination, with a screw-driver bit, of a spring-clamp consisting of two clamping-arms mounted upon a common pivot and adapted to swing over the edge of the bit, substantially as and for the purpose set forth.

3. The combination, with a screw-driver bit, of a spring-clamp pivotally supported upon the bit-shank and adapted to swing over the edge of the bit and provided with a projecting lip that is adapted to engage the wood and cause the clamp to turn on its pivot, substantially as described.

4. The combination of a screw-driver shank having a flat end or face, a bit projecting therefrom, and a spring-clamp pivotally supported upon said shank and adapted to swing over the edge of the bit, substantially as described.

5. The combination, with a screw-driver bit, of a spring-clamping device made of one piece of metal bent to form the arms $c'$ $c'$ at right angles to its round middle part, $c$, and its ends bent inwardly and suitably notched to form the clamps $c^2$ $c^2$, the said middle part, $c$, being passed through a hole in the bit-shank, whereby the clamps may be allowed to swing over the end of the bit to engage a screw-head, all constructed and arranged substantially as set forth.

6. The combination, in a screw-driver, with the bit-shank A, provided with the bit-plate $a$, secured by a rivet or screw, $d$, in a slot in the head of the bit-shank, of the spring-clamping device C, made of one piece of metal having a round middle portion, $c$, arms $c'$ $c'$, and clamps $c^2$ $c^2$, and hinged by inserting said middle part, $c$, in a hole or slot in the bit-shank, so as to allow the clamps to swing over the edge of the bit to engage a screw-head and clamp it against the bit edge.

7. The bit-shank A, having a slot in its end provided with a plate, $a^2$, and a bit-plate, $a$, secured in said slot by a rivet or screw, $d$, in combination with the spring-clamping device C, composed of the middle part, $c$, arms $c'$ $c'$, and clamps $c^2$ $c^2$, having bent lips $c^3$, the said clamp having its middle part secured in the head of said slot, so as to permit the clamps to swing over the bit edge to engage a screw-head, substantially as and for the purpose set forth.

GEORGE W. HAEL.

Witnesses:
A. C. PAUL,
R. H. SANFORD.